United States Patent
Lombardi et al.

(10) Patent No.: US 10,506,404 B2
(45) Date of Patent: Dec. 10, 2019

(54) VOICE CALL MANAGEMENT IN A MODULAR SMARTPHONE

(71) Applicant: Motorola Mobility LLC, Chicago, IL (US)

(72) Inventors: Michael J Lombardi, Lake Zurich, IL (US); Joseph L Allore, Mundelein, IL (US); Paul Fordham, Wauconda, IL (US)

(73) Assignee: MOTOROLA MOBILITY LLC, Chicago, IL (US)

( * ) Notice: Subject to any disclaimer, the term of this patent is extended or adjusted under 35 U.S.C. 154(b) by 477 days.

(21) Appl. No.: 14/688,361

(22) Filed: Apr. 16, 2015

(65) Prior Publication Data
US 2016/0309283 A1    Oct. 20, 2016

(51) Int. Cl.
| | |
|---|---|
| H04W 4/80 | (2018.01) |
| H04W 76/14 | (2018.01) |
| H04M 1/02 | (2006.01) |
| H04M 1/60 | (2006.01) |
| H04W 4/16 | (2009.01) |
| H04W 76/23 | (2018.01) |
| H04M 1/725 | (2006.01) |

(52) U.S. Cl.
CPC .......... *H04W 4/80* (2018.02); *H04M 1/0256* (2013.01); *H04M 1/6041* (2013.01); *H04W 76/14* (2018.02); *H04M 1/7253* (2013.01); *H04M 2250/02* (2013.01); *H04W 4/16* (2013.01); *H04W 76/23* (2018.02)

(58) Field of Classification Search
CPC combination set(s) only.
See application file for complete search history.

(56) References Cited

U.S. PATENT DOCUMENTS

| | | | |
|---|---|---|---|
| 2005/0089186 A1* | 4/2005 | Kulas | H04M 1/0258 381/384 |
| 2006/0165243 A1* | 7/2006 | Lee | H04M 1/6066 381/74 |
| 2007/0135185 A1* | 6/2007 | Dvorak | H04M 1/0258 455/575.2 |

(Continued)

OTHER PUBLICATIONS

Michael J. Lombardi, et al., "Antenna Tuning in a Modular Portable Communication Device", U.S. Appl. No. 14/625,682, filed Feb. 19, 2015.

(Continued)

*Primary Examiner* — Zhitong Chen
(74) *Attorney, Agent, or Firm* — McKinney Phillips LLC; Phillip Pippenger (57) ABSTRACT

In an embodiment of the disclosed principles, a modular portable device includes a first module acting as a traditional high-function phone or "smartphone" and a second module that adds enhanced functionality to the first module. When the modules are separated, they may operate independently of each other. In an embodiment, when the first module and the second module are docked together and a voice call is placed with the first module, the earpiece speaker, microphone, and cellular connection of the first module are utilized. During the voice call, a Bluetooth connection between the first module and the second module may be established in anticipation of an undocking event to eliminate a delay in audio transfer from the first module to the second module.

15 Claims, 8 Drawing Sheets

(56) References Cited

U.S. PATENT DOCUMENTS

2011/0230178 A1    9/2011    Jones et al.
2012/0028581 A1    2/2012    Lee et al.
2013/0143540 A1    6/2013    Kalra et al.

OTHER PUBLICATIONS

Michael J. Lombardi, et al., "Remote Imaging in Modular Cellular Phone", U.S. Appl. No. 14/663,521, filed Mar. 20, 2015.
Michael J. Lombardi, et al., "WIFI Connectivity in a Modular Portable Cellular Device", U.S. Appl. No. 14/663,716, filed Mar. 20, 2015.
Michael J. Lombardi, et al., "Adaptive Audio in Modular Portable Electronic Device", U.S. Appl. No. 14/737,990, filed Jun. 12, 2015.

* cited by examiner

VOICE CALL MANAGEMENT IN A MODULAR SMARTPHONE

TECHNICAL FIELD

The present disclosure is related generally to mobile communication device call handling, and, more particularly, to a system and method of speaker and mic management in a modular portable communication device.

BACKGROUND

Despite the extensive capabilities of modern cellular phones, voice calls remain a primary use of such devices. Indeed, while texting has replaced many voice calls, texting remains impractical when either party is driving or otherwise engaged with their eyes and/or hands. In addition, many consumers do not even maintain a landline anymore, choosing instead to use their cellular phone for all voice calls.

Most cellular phones have different modes of usage for voice calls, e.g., calls may be handled in a speakerphone mode or a handheld mode. However, in a modular system, wherein the portable device comprises two or more separable parts with each part being capable of independent operation, it is difficult to establish a default mode in which to receive calls.

While the present disclosure is directed to a system that can eliminate certain shortcomings noted in this Background section, it should be appreciated that such a benefit is neither a limitation on the scope of the disclosed principles nor of the attached claims, except to the extent expressly noted in the claims. Additionally, the discussion of technology in this Background section is reflective of the inventors' own observations, considerations, and thoughts, and is in no way intended to accurately catalog or comprehensively summarize the art in the public domain. As such, the inventors expressly disclaim this section as admitted or assumed prior art with respect to the discussed details. Moreover, the identification herein of a desirable course of action reflects the inventors' own observations and ideas, and should not be assumed to indicate an art-recognized desirability.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Before presenting a fuller discussion of the disclosed principles, an overview is given to aid the reader in understanding the later discussion. As noted above, the handling of incoming and outgoing voice calls is complicated in modular devices due to the difficulty in determining a default mode in which to begin the call. For example, when a modular device is being used in a remote imaging application wherein its modules are separated, it is not clear how such a device will respond to an incoming call at the primary module. That is, answering the call at the primary module may initiate either a speakerphone session or a handheld session.

In an embodiment of the disclosed principles, a modular portable device includes two modules, including a first module acting as a traditional high-function phone or "smartphone" and a second module that adds enhanced functionality to the first module. When the modules are separated, they can each perform functions independently of each other. The first device includes cellular connectivity and is able to place and receive voice calls. An earpiece speaker, loudspeaker, and a microphone are included in the first device as well as Bluetooth or other short range connectivity. The second module may not have cellular connectivity, but it may include an earpiece speaker, microphone, loudspeaker, and Bluetooth or other short range connectivity.

In an embodiment, when the first device and the second device are docked together and a voice call is placed with the first device, the earpiece speaker, microphone, and cellular connection of the first device are utilized. During the voice call, a Bluetooth connection between the first device and the second device may be established in anticipation of an undocking event to eliminate a delay in audio transfer from the first device to the second device.

During the voice call, if the second device is undocked from the first device, the undocking event triggers a transitioning of the call to speakerphone mode on the second device. This mode utilizes the loudspeaker of the second device, microphone of the second device, Bluetooth connection between the first device and the second device, and the cellular connection of the first device.

Alternately, during the voice call, an undocking event automatically triggers a modification to audio routing and mixing such that both the first device earpiece speaker and mic and the second device earpiece speaker and mic are simultaneously active. The second device is wirelessly connected to the first device via Bluetooth in this mode, and the first device mixes the incoming Bluetooth microphone audio stream from the second device with the audio stream from the first device microphone. An intentional delay may be added to the first device microphone to accommodate the wireless latency of the second device.

When the first device and the second device are in an undocked state and a voice call is in progress through either the first device, the second device, or both, other default behavior is provided in an embodiment. In particular, during the voice call, if the two devices are docked together while in speakerphone mode on either or both devices, then the call is maintained via the loudspeakers and microphones of one or both devices.

During the voice call, if the two devices are docked together while in earpiece mode (handheld mode) on either device, then the call is maintained via the earpiece speaker and microphone of the first device in the docked configuration. During the voice call, if the two devices are docked together while in different modes, then the call is maintained in the newly docked configuration using the same mode that the first device was using in the undocked configuration.

With this overview in mind, and turning now to a more detailed discussion in conjunction with the attached figures, the techniques of the present disclosure are illustrated as being implemented in a suitable computing environment. The following device description is based on embodiments and examples of the disclosed principles and should not be taken as limiting the claims with regard to alternative embodiments that are not explicitly described herein. Thus, for example, while FIG. 1 illustrates an example mobile device within which embodiments of the disclosed principles may be implemented, it will be appreciated that other device types may be used, including but not limited to personal computers, tablet computers and other devices.

Figure 1:
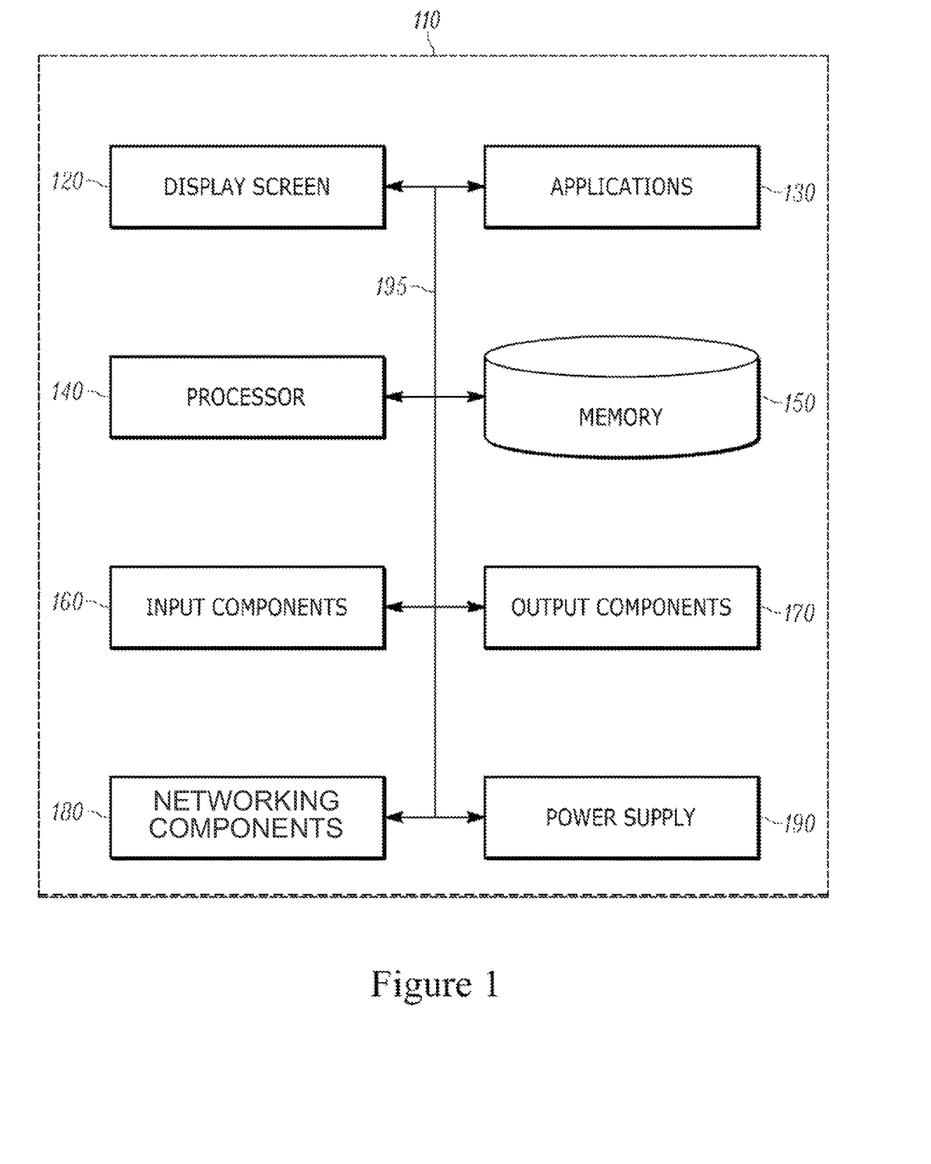
FIG. 1 is a simplified schematic of an example configuration of device components with respect to which embodiments of the presently disclosed principles may be implemented.

The schematic diagram of FIG. 1 shows an exemplary component group 110 forming part of an environment within which aspects of the present disclosure may be implemented. In particular, the component group 110 includes exemplary components that may be employed in a device corresponding to the first device and/or the second device. It will be appreciated that additional or alternative components may be used in a given implementation depending upon user preference, component availability, price point, and other considerations.

In the illustrated embodiment, the components 110 include a display screen 120, applications (e.g., programs) 130, a processor 140, a memory 150, one or more input components 160 such as speech and text input facilities, and one or more output components 170 such as text and audible output facilities, e.g., one or more speakers.

The processor 140 may be any of a microprocessor, microcomputer, application-specific integrated circuit, or the like. For example, the processor 140 can be implemented by one or more microprocessors or controllers from any desired family or manufacturer. Similarly, the memory 150 may reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device). Additionally or alternatively, the memory 150 may include a read only memory (i.e., a hard drive, flash memory or any other desired type of memory device).

The information that is stored by the memory 150 can include program code associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device. Such functions may include, for example, interaction among various internal components and storage and retrieval of applications and data to and from the memory 150.

Further with respect to the applications 130, these typically utilize the operating system to provide more specific functionality, such as file system service and handling of protected and unprotected data stored in the memory 150. Although many applications may provide standard or required functionality of the user device 110, in other cases applications provide optional or specialized functionality, and may be supplied by third party vendors or the device manufacturer.

Finally, with respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation.

The device having component group 110 may include software and hardware networking components 180 to allow communications to and from the device. Such networking components 180 will typically provide wireless networking functionality, although wired networking may additionally or alternatively be supported.

In an embodiment, a power supply 190, such as a battery or fuel cell, may be included for providing power to the device and its components 110. All or some of the internal components 110 communicate with one another by way of one or more shared or dedicated internal communication links 195, such as an internal bus.

In an embodiment, the device 110 is programmed such that the processor 140 and memory 150 interact with the other components of the device 110 to perform certain functions. The processor 140 may include or implement various modules and execute programs for initiating different activities such as launching an application, transferring data, and toggling through various graphical user interface objects (e.g., toggling through various display icons that are linked to executable applications).

Figure 2:
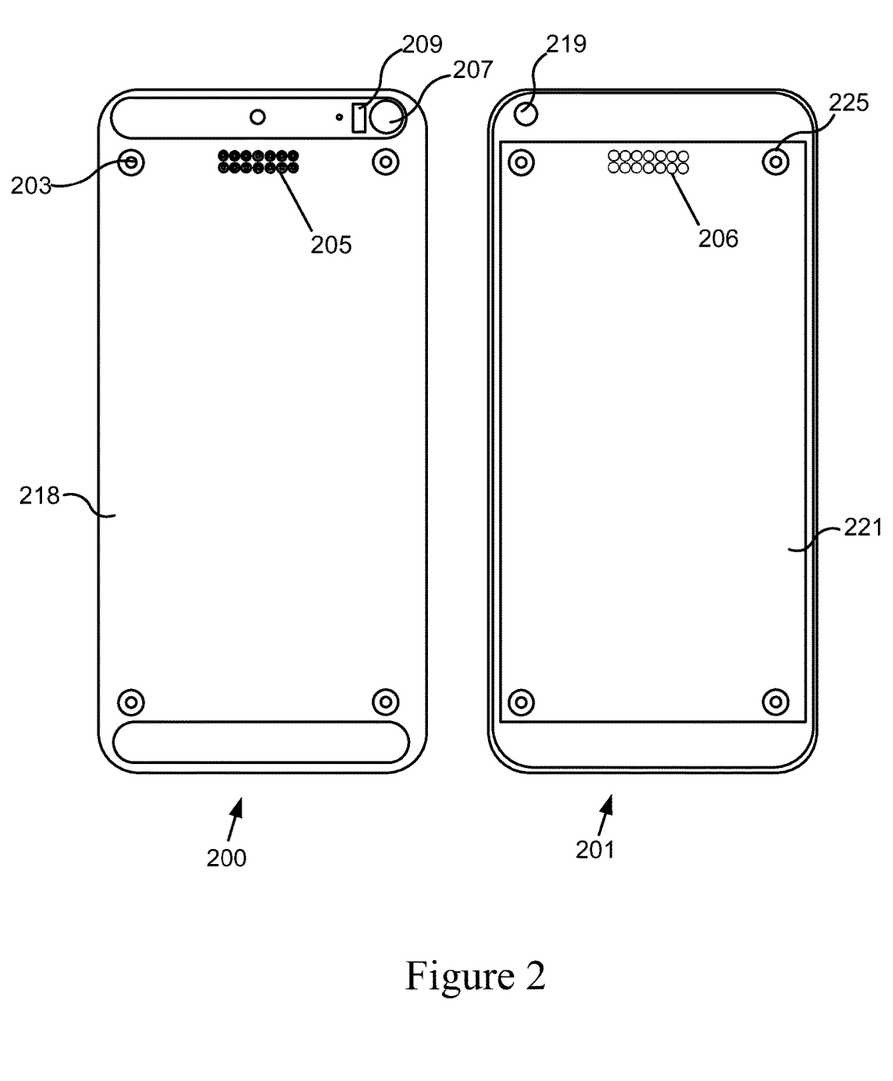
FIG. 2 is view of a first device and a second device, showing the back of the first device and the front of the second device in accordance with an embodiment of the disclosed principles.

Turning to FIG. 2, this figure presents a view of a first device and a second device, showing the back of the first device and the front of the second device in accordance with an embodiment of the disclosed principles. In the illustrated example, the back 218 of the first device 200 includes one or more alignment features 203 configured and placed to mate with mating features 225 on the front 221 of the second device 201.

In addition, the back of the first device 200 in the illustrated embodiment includes a connector array 205. The connector array 205 is located and configured to mate with a mating connector array 206 on the front 221 of the second device 201. In the illustrated example, the back of the first device 200 further includes a built-in camera 207 and an associated flash 209.

To enable audio interaction with the user, the first and second devices 200, 201 include earpiece speakers, loudspeakers and microphones as noted above. These features are visible in FIG. 3 which shows the front side 300 of the first device 200 and the back side 302 of the second device 201 in accordance with an embodiment of the disclosed principles. In the illustrated example, the front side 300 of the first device 200 includes an earpiece speaker 301 close to its top edge as well as a loudspeaker 303 and a mic 305. Similarly, the back side 302 of the second device 201 includes an earpiece speaker 307, a loudspeaker 309 and a mic 311. In the illustrated example, the front side 300 of the first device 200 also includes a display screen 317, which may be a touch screen display for example. In an alternative embodiment, the earpiece speaker 307 and microphone 311 of the second device 201 may port through the front 221 of the second device 201 instead of porting through the back 302.

Figure 3:
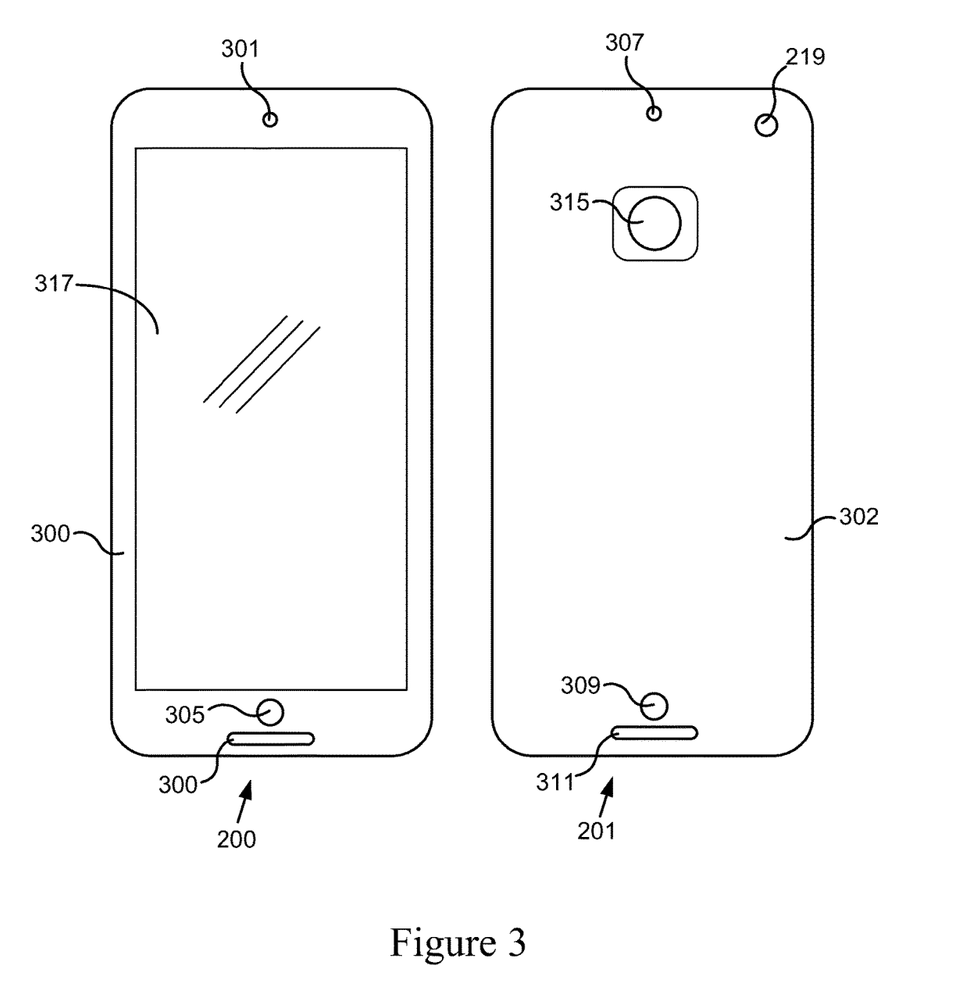
FIG. 3 is view of a first device and a second device, showing the front of the first device and the back of the second device in accordance with an embodiment of the disclosed principles.

In the illustrated example, the second device 201 provides at least an enhanced camera function. To this end, the second device 201 includes on its back face a camera 315. Further, in the illustrated example, use of the camera 315 of the second device 201 does not preclude the use of the camera 207 of the first device 200. As such, a hole 219 is provided in the second device 201 to allow a sight line for the camera 207 of the first device 200.

Figure 4:
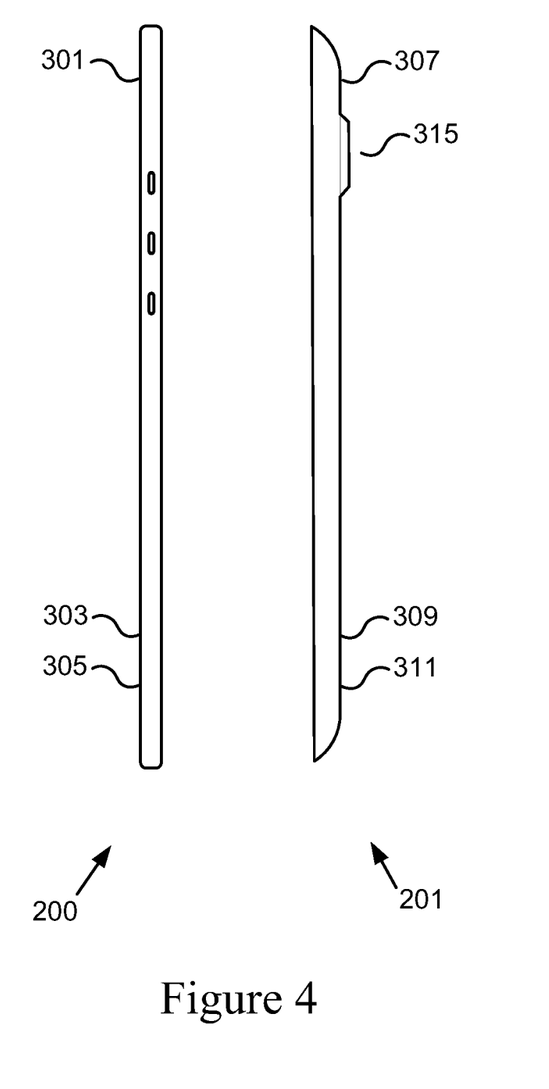
FIG. 4 is side view of the first device and the second device in accordance with an embodiment of the disclosed principles.
Figure 5:
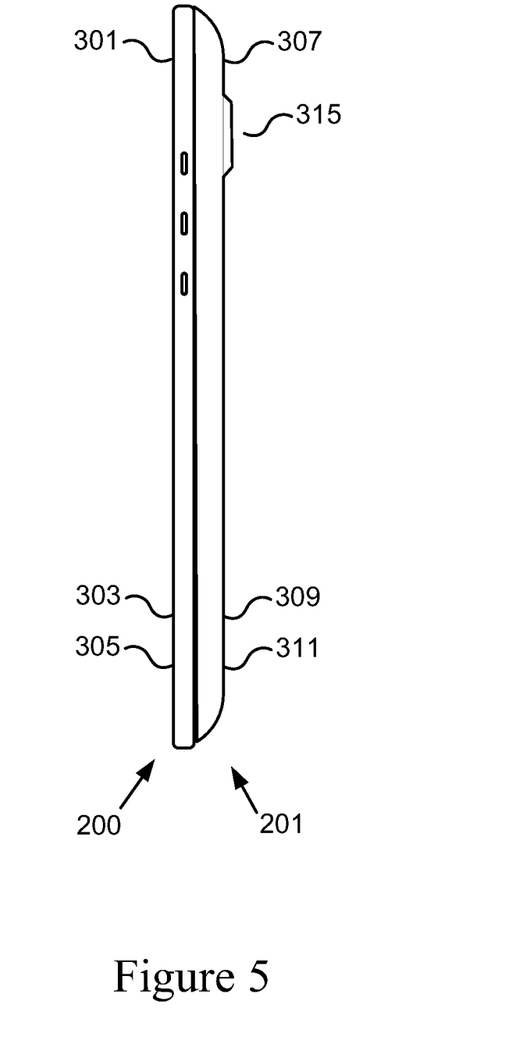
FIG. 5 is side view of the first device and the second device mated together via the back of the first device and the front of the second device in accordance with an embodiment of the disclosed principles.

For further physical context regarding the device orientations and connection scenarios, FIG. 4 is a side view of the first device 200 and the second device 201, not yet mated (docked) together. Continuing, FIG. 5 is a side view of the first device 200 and the second device 201 mated together at the back 218 of the first device 200 and the front 221 of the second device 201 in accordance with an embodiment of the disclosed principles. As can be seen, the devices 200, 201 are in physical contact when mated. In should be noted that different embodiments of either device 200, 201 may vary significantly in thickness and shape from one another.

Figure 6:
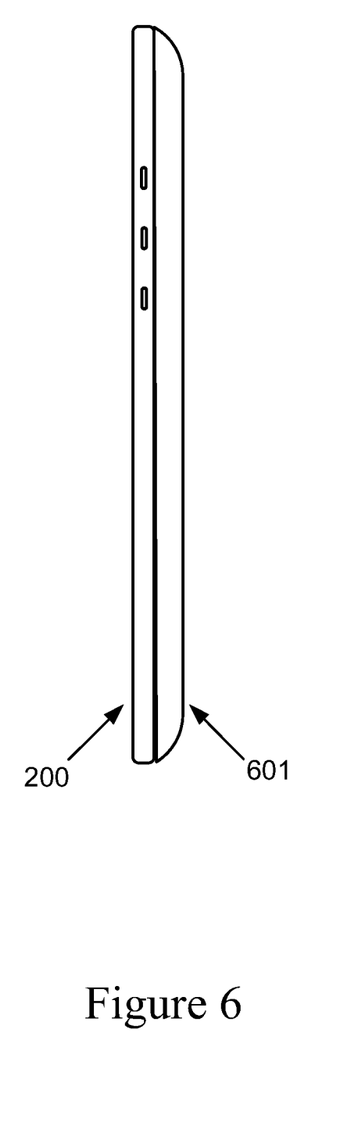
FIG. 6 is side view of the first device and a third device mated together via the back of the first device and the front of the third device in accordance with an embodiment of the disclosed principles.

Before proceeding with a discussion of specific embodiments of the voice call handling process, it should be noted that the second device 201 may be any one of multiple available device types. For example, while FIGS. 2-5 illustrate the second device 201 as providing a camera function, FIG. 6 shows the first device 200 mated to an alternative second device 601, also referred to herein as a third device. The third device 601 is similar to the second device 201 but lacks a camera. The third device 601 may also incorporate one or more other features not found on the second device 201, such as additional battery capacity, wireless capabilities, audio playback capabilities, and so on.

It will be appreciated that the first and second devices 200, 201 (601) need not be formed or configured precisely as described in the foregoing examples, and that various device behavior modifications may be made, including or instead of those described above.

Figure 7:
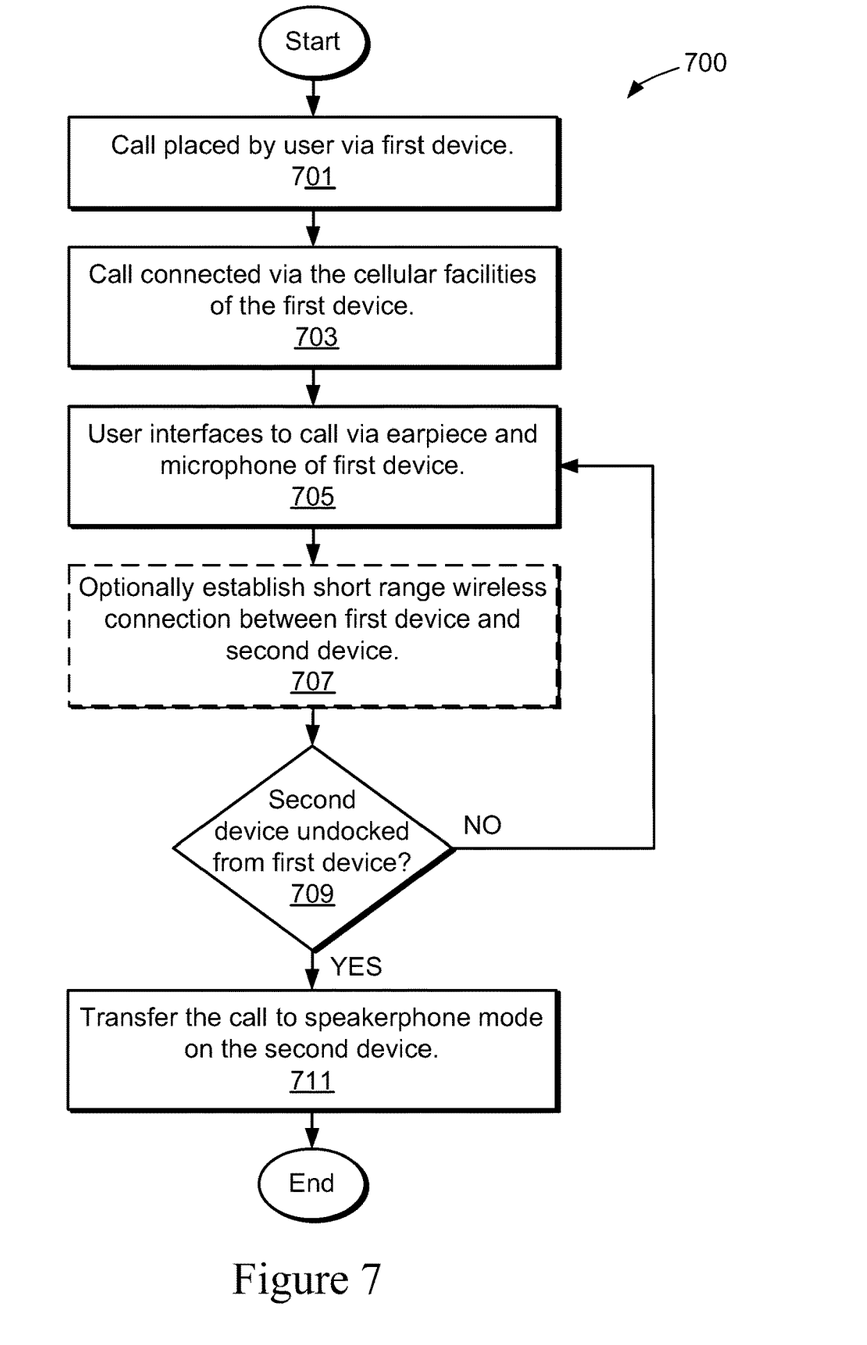
FIG. 7 is a flowchart illustrating a process in accordance with an embodiment of the disclosed principles.

Regardless of the particular device configurations, FIG. 7 illustrates an example process 700 executed by the processors of the first device 200 and second device 201 to configure a call mode when the devices 200, 201 are docked together and a voice call is placed via the first device 200. At stage 701 of the process 700, a call is placed by the user via the first device 200. The call is connected via the cellular facilities of the first device 200 at stage 703, and the user interfaces to the call via the earpiece speaker 301 and microphone 305 of the first device 200 at stage 705.

During the voice call, a Bluetooth or other short range wireless connection is optionally established at stage 707 between the first device 200 and the second device 201 in anticipation of an undocking event. This will serve to eliminate a source of delay in audio transfer from the first device 200 to the second device 201.

If the second device 201 is undocked from the first device 200 at stage 709 during the voice call, the undocking event causes the processor of the first device 200 to transfer the call to speakerphone mode on the second device 201 at stage 711. In this mode, the call utilizes the cellular connection of the first device 200, the loudspeaker 309 and microphone 311 of the second device 201, as well as the Bluetooth connection between the devices 200, 201.

Alternately, however, during the voice call, an undocking event automatically triggers a modification to audio routing and mixing such that both the first device 200 earpiece speaker 301 and mic 305 and the second device 201 earpiece speaker 307 and mic 311 are simultaneously active. In this mode, the second device 201 is wirelessly connected to the first device 200 via Bluetooth and the first device 200 mixes the incoming Bluetooth microphone audio stream from the second device 201 with the audio stream from the first device 200 microphone 305. An intentional delay may be added to the first device 200 microphone 305 to synchronize it with the audio from the second device 201 after accounting for the wireless latency of the second device 201.

Figure 8:
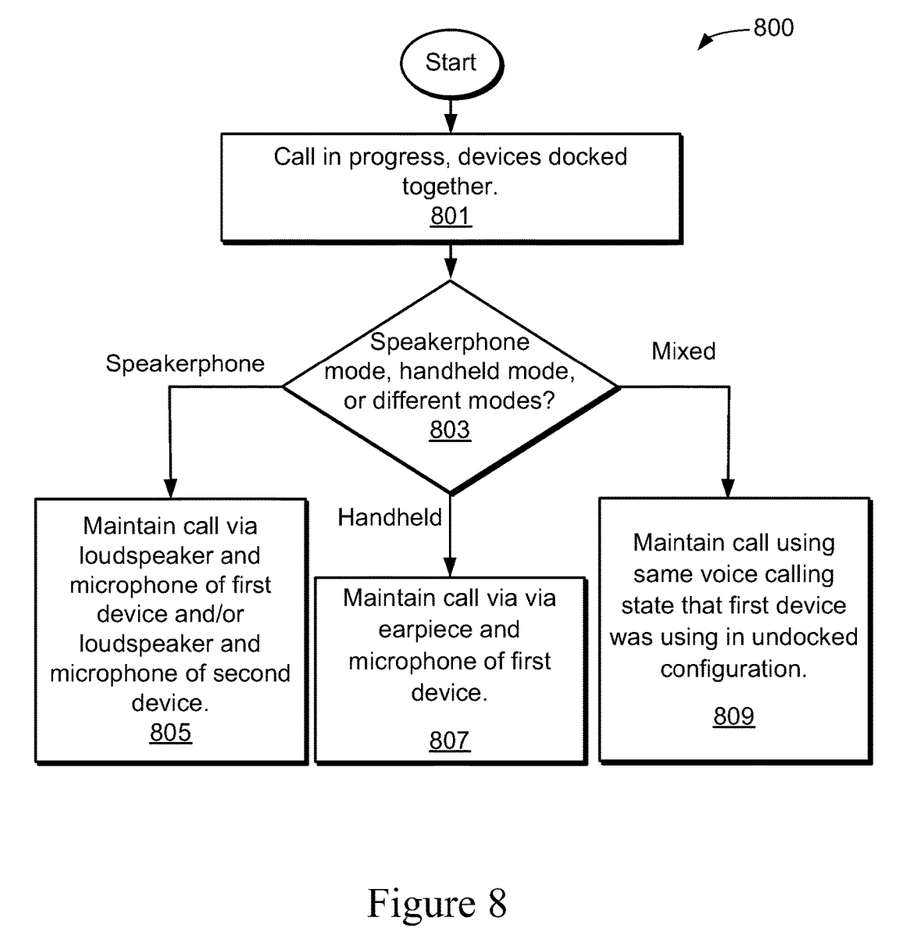
FIG. 8 is a flowchart illustrating a process in accordance with an embodiment of the disclosed principles.

In another embodiment, the devices 200, 201 may be undocked at the time a voice call begins and may then be docked while the call is still in progress. Example call management in this situation is shown in the flowchart of FIG. 8. At the start of the process 800, the devices 200, 201 are apart and a call is in progress. At stage 801, the two devices 200, 201 are docked together. At stage 803, it is determined whether the call is being handled in speakerphone mode, handheld mode, or different modes on the different devices 200, 201.

If the call is being handled in speakerphone mode, the process flows to stage 805 upon docking, wherein the call is maintained via the loudspeaker 303 and microphone 305 of the first device 200 and/or the loudspeaker 309 and microphone 311 of the second device 201.

If the call is being handled in earpiece mode on both devices 200, 201, then the process flows to stage 807, wherein the call is maintained after docking via the earpiece speaker 301 and microphone 305 of the first device 200.

Finally, if the two devices are docked together during the voice call while in different modes on both devices 200, 201, then the process flows to stage 809, wherein the call is maintained using the same voice calling state that the first device 200 was using in the undocked configuration.

It will be appreciated that a system and method for call handling in a modular portable device have been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method of managing call functionality in a modular portable communications device having a primary module with cellular connectivity and a secondary module, each module having two ends and including a respective earpiece speaker, loudspeaker and microphone, the method comprising:

servicing a telephone call using the cellular connectivity, microphone and earpiece speaker of the primary module, wherein the primary module includes two opposite ends with the earpiece speaker of the primary module being located at a first end of the primary module and the loudspeaker of the primary module being located at a second end of the primary module, the call being originated while the secondary module is docked to the primary module;

detecting undocking of the secondary module from the primary module;

opening a short range wireless connection between the primary module and the secondary module; and in response to detecting undocking of the secondary module from the primary module, reconfiguring the primary module and the secondary module such that after the undocking of the secondary module from the primary module, the telephone call is continued via the microphone and loudspeaker of the secondary module and the cellular connectivity of the primary module, wherein the secondary module includes two opposite ends with the earpiece speaker of the secondary module being located at a first end of the secondary module and the loudspeaker of the secondary module being located at a second end of the secondary module.

2. The method in accordance with claim 1, wherein servicing the telephone call using the cellular connectivity, microphone and earpiece speaker of the primary module comprises initiating the telephone call.

3. The method in accordance with claim 1, wherein servicing the telephone call using the cellular connectivity, microphone and earpiece speaker of the primary module comprises answering the telephone call.

4. The method in accordance with claim 1, wherein the step of opening a short range wireless connection between the primary module and the secondary module is executed prior to the step of detecting undocking of the secondary module from the primary module.

5. The method in accordance with claim 1, wherein the step of opening a short range wireless connection between the primary module and the secondary module is executed after and in response to the step of detecting undocking of the secondary module from the primary module.

6. The method in accordance with claim 1, wherein continuing the telephone call via the microphone and loudspeaker of secondary module and the cellular connectivity of the primary module includes also continuing to service the call via two or more of the earpiece speaker, loudspeaker and microphone of the primary module.

7. The method in accordance with claim 6, wherein continuing to service the call via two or more of the earpiece speaker, loudspeaker and microphone of the primary module comprises adding a delay to an output of the microphone of the primary module to accommodate a wireless latency of the secondary module.

8. The method in accordance with claim 7, further comprising mixing the output of the microphone of the secondary module and the delayed output of the microphone of the primary module and transmitting the mixed signal via the cellular connectivity of the primary module.

9. A modular portable communications device comprising:
a primary module having cellular connectivity, an earpiece speaker, a loudspeaker and a microphone, wherein the primary module includes two opposite ends with the earpiece speaker of the primary module being located at a first end of the primary module and the loudspeaker of the primary module being located at a second end of the primary module;

a secondary module, having an earpiece speaker, a loudspeaker and a microphone, wherein the secondary module includes two opposite ends with the earpiece speaker of the secondary module being located at a first end of the secondary module and the loudspeaker of the secondary module being located at a second end of the secondary module; and a processor associated with the primary module, configured to service a telephone call using the cellular connectivity, microphone and earpiece speaker of the primary module, the call being originated while the secondary module is docked to the primary module, detect undocking of the secondary module from the primary module, open a short range wireless connection between the primary module and the secondary module, and in response to detecting undocking of the secondary module from the primary module, continue the telephone call via the microphone and loudspeaker of the secondary module and the cellular connectivity of the primary module.

10. The modular portable communications module in accordance with claim 9, wherein servicing the telephone call using the cellular connectivity, microphone and earpiece speaker of the primary module comprises initiating the telephone call.

11. The modular portable communications module in accordance with claim 9, wherein servicing the telephone call using the cellular connectivity, microphone and earpiece speaker of the primary module comprises answering the telephone call.

12. The modular portable communications device in accordance with claim 9, wherein opening a short range wireless connection between the primary module and the secondary module occurs prior to detecting undocking of the secondary module from the primary module.

13. The modular portable communications device in accordance with claim 9, wherein opening a short range wireless connection between the primary module and the secondary module occurs after and in response to the step of detecting undocking of the secondary module from the primary module.

14. The modular portable communications device in accordance with claim 9, wherein continuing the telephone call via the microphone and loudspeaker of secondary module and the cellular connectivity of the primary module includes also continuing to service the call via two or more of the earpiece speaker, loudspeaker and microphone of the primary module.

15. The modular portable communications device in accordance with claim 14, wherein continuing to service the call via two or more of the earpiece speaker, loudspeaker and microphone of the primary module comprises adding a delay to an output of the microphone of the primary module to accommodate a wireless latency of the secondary module.

\* \* \* \* \*